Aug. 19, 1941.    M. E. MORRELL    2,253,085
MACHINE TOOL
Filed July 5, 1940

INVENTOR
M.E. MORRELL
BY J. MacDonald
ATTORNEY

Patented Aug. 19, 1941

2,253,085

UNITED STATES PATENT OFFICE 2,253,085

MACHINE TOOL

Millard E. Morrell, Mattawan, N. J., assignor to Bell Telephone Laboratories, Incorporated, New York, N. Y., a corporation of New York Application July 5, 1940, Serial No. 344,127

4 Claims. (Cl. 164—71)

This invention relates to machine tools and more specifically to a tool for cutting washers and the like from a sheet of metal or other material.

The object of the invention is to produce a tool of this character in which no parts project beyond the rotating member, in which the cutting tool is held more firmly than in such tools heretofore known, and in which the cutter is adjustable through an eccentric motion. In fly cutters used at the present time, the cutting tool is supported in the extreme end of a cross-arm mounted at right angles to the shank. In using such machines the rotation of the cross-arm introduces a real hazard and the operator is in constant danger of injuries.

In accordance with this invention, a washer cutting tool is provided in which a mounting for a cutter and its securing means is formed with a shank portion used for securing the tool to the chuck of a drilling machine or that of a lathe, an eccentric disc portion at one end of the shank portion and a reduced portion formed with the disc portion coaxial to the longitudinal axis of the shank, such reduced portion providing means for engaging a drilled hole in the plate of material for holding the cutter centered relative to the diameter of the washer to be cut. Means in the form of a ring is fitted for rotary movement on the eccentric disc portion of the mounting with means carried by this ring for receiving and securing the cutter in adjusted position around and against the periphery of the eccentric disc portion, while means carried by the ring is provided for engaging a guide-way formed at the periphery of the eccentric disc to serve for holding the ring against longitudinal movement of this disc independently of the cutter's securing means.

In a modification of the tool of the invention, screw threads are formed at the periphery of the eccentric disc in the manner of a worm gear to be engaged by a worm to form a micrometer adjustment mechanism for rotating the ring and the cutter carried thereby in adjustment relative to the center of the reduced or guide portion coaxial to the longitudinal axis of the shank.

Other novel features and advantages of the invention will appear from the following description and by the claims appended thereto, reference being had to the accompanying drawing in which:

In the washer cutting tool of the invention, a mounting is formed having a shank portion SP which is provided for securing the tool to the chuck of a drilling machine or that of a lathe, a disc portion D formed eccentrically to the shank portion SP and a reduced portion RP formed on the opposite side of the disc D coaxial to the shank portion, this reduced portion serving for engaging a similarly sized hole in the plate from which the washer is to be cut for holding the cutter centered relative to the diameter of the washer during the cutting operation.

Figure 1:
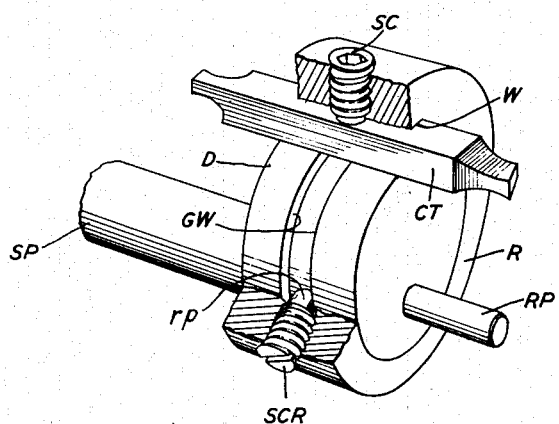
Fig. 1 is an assembled view shown in perspective, showing a number of operating parts with portions cut away.
Figure 2:
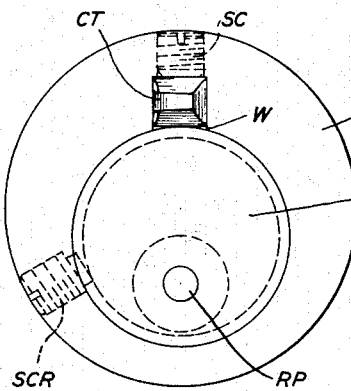
Fig. 2 is a right-hand view.
Figure 3:
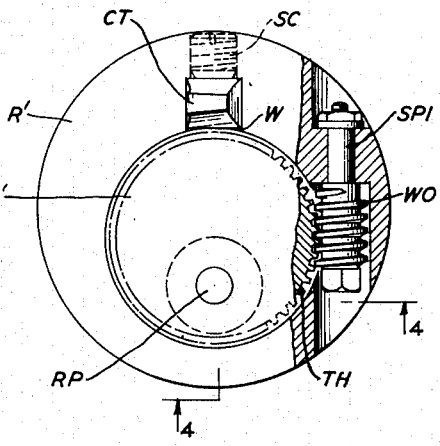
Fig. 3 is another end view of the washer cutting tool modified, showing the ring partly in section so as to show the micrometer adjusting mechanism more clearly.

On the periphery of disc portion D is mounted for rotary adjustment thereon a ring R having a key-way W formed at right angles to its plane of rotation for receiving a cutter as CT which may be held against longitudinal movement in its key-way by a set screw SC engaging a similarly threaded radially disposed hole in the reenforced portion of ring R as shown in Figs. 1, 2 and 3, the tightening of this screw being effective to secure the ring R from relative rotary movement on the periphery of its supporting disc D. The disc portion D of the mounting is provided at its periphery with a circular guide-way GW engaged by the reduced end portion rp of a screw SCR itself engaging a similarly screw-threaded hole in the ring R, the function of this screw being to hold the ring R against longitudinal and rotary movement on the disc portion D following the loosening of screw SC as when removing the cutter CT from its key-way W for sharpening.

Figure 4:
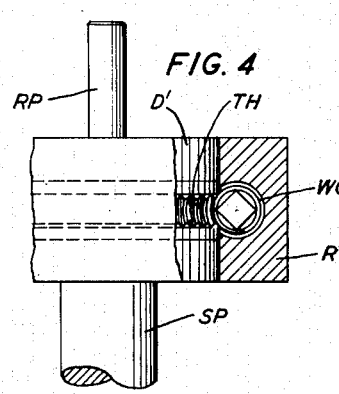
Fig. 4 is a sectional view taken on line 4—4 of Fig. 3.

In the modification of the washer cutting tool of the invention as shown in Figs. 3 and 4, the adjusting rotary movement of ring R' relative to disc D', as for moving the cutter in adjusted radial distance from the center of reduced portion RP, is effected by a worm WO having a spindle portion SPI mounted for rotary movement in a bearing in ring R', the worm WO engaging the thread TH formed in a circular groove at a periphery of the eccentric disc D' in the manner of a worm and worm gear so as to form a so-called micrometer adjustment serving for radially positioning the cutter CT in adjustment after which it may be secured against longitudinal movement in its key-way and against the periphery of the disc D' as by tightening the screw SC shown in Figs. 1, 2 and 3.

It will be seen from the foregoing that my invention provides a washer cutting tool which uses a minimum number of simple operating parts which are easily adjusted accurately and in which, unlike the well-known so-called fly cutter type washer cutting tool, no operating part protrudes beyond the surface of the ring R and therefore the liability of accidents during washer cutting operations is reduced.

It is understood that minor changes may be made to the tool of the invention without departing from the scope of the appended claims.

What is claimed is:

1. A tool comprising a mounting having a shank, a disc and a reduced portion, said disc being formed eccentrically to said shank portion and said reduced portion, a ring fitted for rotary adjusting movement on the periphery of said disc, means for securing said ring on said disc following such adjusting movement, a cutter, key-way in said ring for receiving said cutter, and means carried by said ring for securing said cutter against the periphery of said disc.

2. A tool comprising a mounting having a shank, a disc and a reduced portion, said disc being formed eccentrically to said shank and said reduced portion, a circular guide-way formed at the periphery of said disc, a ring mounted for rotary adjusting movement on said disc, means carried by said ring engaging said guide-way for preventing longitudinal movement of said ring on said disc and for securing said ring in adjustment on said disc, a cutter, a key-way for said cutter formed in said ring and means for securing said cutter in said key-way against the periphery of said disc.

3. In a tool, a cutter, a mounting having a shank portion, a disc formed eccentrically relative to the longitudinal axis of said shank portion, a reduced portion formed coaxially to said shank portion, a ring mounted on the periphery of said disc, said ring having a key-way for receiving said cutter, a micrometer mechanism for imparting rotary adjusting movement to said ring on said disc and means for securing said cutter in said key-way against the periphery of said disc following such adjusting movement.

4. In a tool, a cutter, a mounting element having a shank portion, a disc formed eccentrically of said shank portion and a reduced portion coaxial to said shank portion, screw threads formed at the periphery of said disc, a ring member mounted for rotary movement on said disc, a worm journaled in said ring and engaging said screw threads to cause relative movement between said disc and said ring upon the rotation of said worm, a key-way in said ring for receiving said cutter and means carried by said ring for securing said cutter collectively against the periphery of said disc.

MILLARD E. MORRELL.